(12) United States Patent
Ying

(10) Patent No.: US 6,408,190 B1
(45) Date of Patent: Jun. 18, 2002

(54) SEMI BUILT-IN MULTI-BAND PRINTED ANTENNA

(75) Inventor: Zhinong Ying, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/387,494

(22) Filed: Sep. 1, 1999

(51) Int. Cl.[7] .............................. H04B 1/38; H04M 1/00; H01Q 1/24

(52) U.S. Cl. ..................... 455/553; 455/90; 455/129; 343/702; 343/700 MS

(58) Field of Search ................... 455/550, 553, 455/552, 90, 129, 272, 73; 343/702, 700 MS, 850, 767, 746, 860

(56) References Cited

U.S. PATENT DOCUMENTS

| | | | |
|---|---|---|---|
| 4,571,595 A | | 2/1986 | Phillips et al. |
| 6,166,694 A | * | 12/2000 | Ying |
| 6,204,819 B1 | * | 3/2001 | Hayes et al. |
| 6,343,208 B1 | * | 1/2002 | Ying |

FOREIGN PATENT DOCUMENTS

| | | |
|---|---|---|
| DE | 197 07 535 A1 | 8/1998 |
| EP | 0 892 459 A1 | 1/1999 |
| EP | 0 924 797 A1 | 6/1999 |
| JP | 6-37531 | 2/1994 |
| WO | WO 96/27219 | 9/1996 |
| WO | WO 98/56066 | 12/1998 |
| WO | WO 99/03168 | 1/1999 |
| WO | WO00/36700 | 6/2000 |

OTHER PUBLICATIONS

"Microwave Filters and Antennas for Personal Communication Systems", pp. 3/1–3/6, Feb. 1994, London UK.

* cited by examiner

*Primary Examiner*—Nguyen T. Vo
(74) *Attorney, Agent, or Firm*—Burns, Doane, Swecker & Mathis, L.L.P.

(57) ABSTRACT

The present invention provides a miniature, built-in multi-band antenna which is suitable for use in future compact mobile terminals. According to exemplary embodiments, a semi built-in printed antenna is provided which includes patch elements of different sizes and capable of being tuned to different frequency bands. An internal patch element is located on a printed circuit board (PCB) within a communication device and another patch element is located outside the PCB. On each patch element is formed a slot which divides the patch element into sub-parts. Each sub-part of the internal patch element is structured so as to be resonant at a frequency in the same frequency band to which the internal patch element is tuned. Each sub-part of the external patch element is similarly structured but having a resonance with a larger bandwidth than the internal patch element and at a frequency band to which the external patch element is tuned. As a result, a high efficiency, broad band, multi-band, and surface mountable low profile antenna can be realized.

28 Claims, 11 Drawing Sheets

FIG. 6b
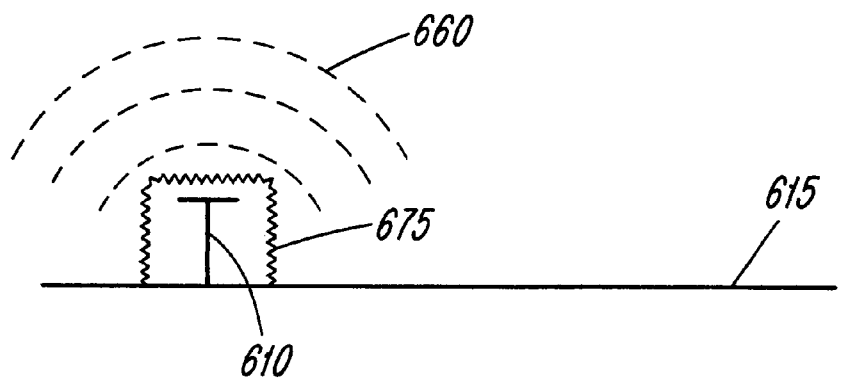
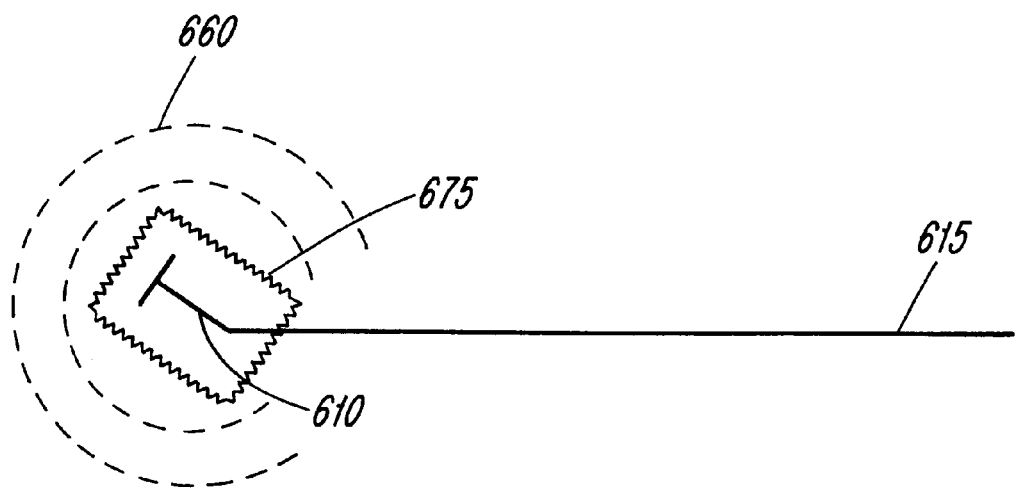
FIG. 6c

SEMI BUILT-IN MULTI-BAND PRINTED ANTENNA

RELATED APPLICATIONS

This application is related to U.S. patent application Ser. No. 09/112,366 to Ying, filed Jul. 9, 1998 and entitled "Miniature Printed Spiral Antenna for Mobile Terminals", U.S. patent application Ser. No. 09/112,152 to Ying, filed Jul. 9, 1998 and entitled "Twin Spiral Dual Band Antenna", and U.S. patent application Ser. No. 09/212,259 to Ying, filed Dec. 16, 1998 and entitled "Printed Multi-Band Patch Antenna," all of which are incorporated by reference in their entireties herein.

BACKGROUND

The present invention relates generally to radio communication systems and, in particular, to built-in antennas which can be incorporated into portable terminals and which allow the portable terminals to communicate within different frequency bands.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems. Once created, these standards tend to be reused in the same or similar form, to specify additional systems. For example, in addition to the original GSM system, there also exists the DCS1800 (specified by ETSI) and PCS1900 (specified by JTC in J-STD-007), both of which are based on GSM.

However, the most recent evolution in cellular communication services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States to include six different frequency bands (A, B, C, D, E and F) in the 1900 MHz region. Thus, eight frequency bands are now available in any given service area of the U.S. to facilitate communication services. Certain standards have been approved for the PCS hyperband (e.g., PCS1900 (J-STD-007)), while others have been approved for the Cellular hyperband (e.g., D-AMPS (IS-136)).

Each one of the frequency bands specified for the Cellular and PCS hyperbands is allocated a plurality of traffic channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, handoff, and cell selection or reselection instructions as a mobile station travels out of the radio coverage of one cell and into the radio coverage of another cell. The control and voice channels may operate using either analog modulation or digital modulation.

The signals transmitted by a base station in the downlink over the traffic and control channels are received by mobile or portable terminals, each of which have at least one antenna. Historically, portable terminals have employed a number of different types of antennas to receive and transmit signals over the air interface. For example, monopole antennas mounted perpendicularly to a conducting surface have been found to provide good radiation characteristics, desirable drive point impedances and relatively simple construction. Monopole antennas can be created in various physical forms. For example, rod or whip antennas have frequently been used in conjunction with portable terminals. For high frequency applications where an antenna's length is to be minimized, another choice is the helical antenna.

It is commercially desirable to offer portable terminals which are capable of operating in widely different frequency bands, e.g., bands located in the 800 MHZ region and bands located in the 1900 MHZ region. Accordingly, antennas which provide adequate gain and bandwidth in both frequency bands will need to be employed in portable terminals. Several attempts have been made to create such dual-band antennas.

For example, U.S. Pat. No. 4,571,595 to Phillips et al. describes a dual-band antenna having a sawtooth-shaped conductor element. The dual-band antenna can be tuned to either of two closely spaced apart frequency bands (e.g., centered at 915 MHz and 960 MHz). This antenna design is, however, relatively inefficient since it is so physically close to the chassis of the mobile phone.

Japanese patent no. 6-37531 discloses a helix which contains an inner parasitic metal rod. In this patent, the antenna can be tuned to dual resonant frequencies by adjusting the position of the metal rod. Unfortunately, the bandwidth for this design is too narrow for use in cellular communications.

Dual-band, printed, monopole antennas are known in which dual resonance is achieve by the addition of a parasitic strip in close proximity to a printed monopole antenna. While such an antenna has enough bandwidth for cellular communications, it requires the addition of a parasitic strip. Moteco AB in Sweden has designed a coil matching dual-band whip antenna and coil antenna, in which dual resonance is achieved by adjusting the coil matching component ($\frac{1}{4}\lambda$ for 900 MHz and $\frac{1}{2}\lambda$ for 1800 MHz). This antenna has relatively good bandwidth and radiation performances and a length in the order of 40 mm. A non-uniform helical dual-band antenna which is relatively small in size is disclosed in copending, commonly assigned U.S. patent application Ser. No. 08/725,507, entitled "Multiple Band Non-Uniform Helical Antennas."

Presently, antennas for radio communication devices, such as mobile phones, are mounted directly on the phone chassis. However, as the size and weight of portable terminals continue to decrease, the above-described antennas become less advantageous due to their size. Moreover, as the functionality of these future compact portable terminals increases, the need arises for a built-in miniature antenna which is capable of being resonant at multiple frequency bands.

Conventional built-in antennas currently in use in mobile phones include microstrip antennas and planar inverted-F antennas. Microstrip antennas are small in size and light in weight. The planar inverted-F antenna (PIFA) has already been implemented in a mobile phone handset, as described by K. Qassim, "Inverted-F Antenna for Portable Handsets", IEE Colloqium on Microwave Filters and Antennas for Personal Communication Systems, pp.3/1-3/6, Feb. 1994, London, UK. More recently, Lai et al. have published a description of a meandering inverted-F antenna (WO 96/27219). This antenna has a size which is about 40% of that of the conventional PIFA antenna.

FIGS. 1A and 1B illustrate the conventional planar patch antenna compared to the meandering inverted-F antenna described in Lai et al. The conventional planar patch antenna of FIG. 1A has both a size and length equal to, for example, a quarter wavelength of the frequency to which the antenna is to be made resonant. The conventional planar patch antenna also has a width W. The meandering inverted-F antenna, illustrated in FIG. 1B, also has a length equal to a quarter wavelength of the resonant frequency and a width equal to W; however, the size of the meandering inverted-F antenna is reduced to about 40% of the size of the conventional planar patch antenna. This reduction in size is attributable to the antenna's meandering shape.

However, as mobile phones become smaller and smaller, both conventional microstrip patch and PIFA antennas are still too large to fit future phone chassis. In copending, commonly assigned U.S. patent application Ser. No. 09/112, 366, entitled "Miniature Printed Spiral Antenna for Mobile Terminals", a printed spiral built-in antenna with a matching post was proposed. The size of the antenna was reduced to 20–30% of the conventional PIFA antenna, which is less than $\frac{1}{10}^{th}$ of a wavelength, in order to make it suitable for future mobile phones.

In addition to a reduced antenna size, next generation mobile phones will require the capability to tune to more than one frequency band for cellular, wireless local area network, GPS and diversity. In copending, commonly assigned U.S. patent application Ser. No. 09/112,152, entitled "Twin Spiral Dual Band Antenna", a multiple band, built-in antenna was proposed which is suitable for future mobile phones. The built-in antenna comprises two spiral conductor arms which are of different lengths and capable of being tuned to different frequency bands. In this design, the bandwidth of the antenna is smaller because thin strip lines are used as radiators. In order to increase bandwidth of the antenna, a compensation method is used by introducing a resistor loading technique on the matching bridge. While this approach leads to a wider bandwidth, it also results in a loss of gain. This antenna is designed for use in two frequency bands.

In copending, commonly assigned U.S. patent application Ser. No. 09/212,259, entitled "Printed Multi-Band Patch Antenna", another new type of dual band patch antenna is disclosed. In contrast to the twin spiral dual band antenna which uses thin strip lines as radiators, the multi-band patch antenna uses patches with slot cutting. The patches are used as radiators and facilitate a wider bandwidth. The multi-band patch antenna is also designed for two frequency bands.

There continues, however, to exist a need for an efficient, miniature, built-in antenna which is capable of tuning to multiple frequency bands while simultaneously having a broad bandwidth in each of those multiple frequency bands. In addition, such antennas should be capable of tuning to a number of different frequency ranges within plural bands.

SUMMARY

The present invention overcomes the above-identified deficiencies in the art by providing a miniature, semi built-in multi-band printed antenna which is suitable for use in future compact mobile terminals by facilitating operation in at least three frequency ranges. According to exemplary embodiments, a semi built-in multi-band printed antenna is provided which includes patch elements of different sizes and capable of being tuned to different frequency bands. On each patch element is formed a slot which divides the patch element into sub-parts. Each sub-part of a patch element is structured so as to be resonant at a frequency in the same frequency band to which the patch element is tuned. As a result, a high efficiency, broad band, multi-band, and surface mountable low profile antenna can be realized which can be used in three frequency ranges where one of the frequency ranges is outside one of the two frequency bands.

BRIEF DESCRIPTION OF THE DRAWINGS

The above objects and features of the present invention will be more apparent from the following description of the preferred embodiments with reference to the accompanying drawings, wherein:

FIG. 6b illustrates the EM field of an antenna located on a printed circuit board (PCB);

FIG. 6c illustrates the EM field of an,antenna located outside the PCB;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2:
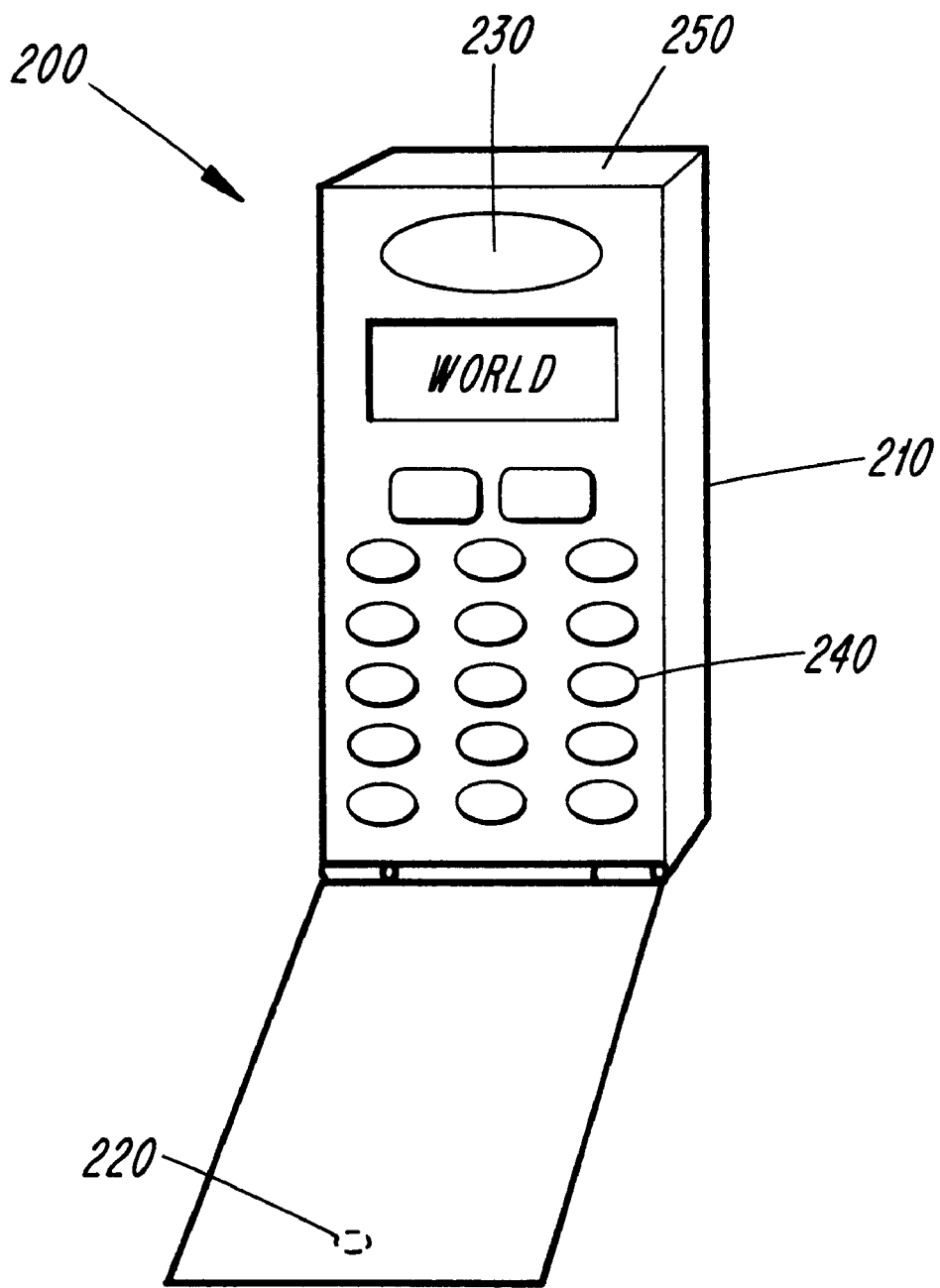
FIG. 2 illustrates an exemplary radio communication device in which the antenna of the present invention may be implemented.

FIG. 2 illustrates an exemplary radio communication device 200 in which the built-in multiple band patch antenna of the present invention may be implemented. Communication device 200 includes a chassis 210 having a microphone opening 220 and speaker opening 230 located approximately next to the position of the mouth and ear, respectively, of a user. A keypad 240 allows the user to interact with the communication device, e.g., by inputting a telephone number to be dialed. The communication device 200 also includes a built-in patch antenna assembly 250, the details of which will be described below.

Figure 3:
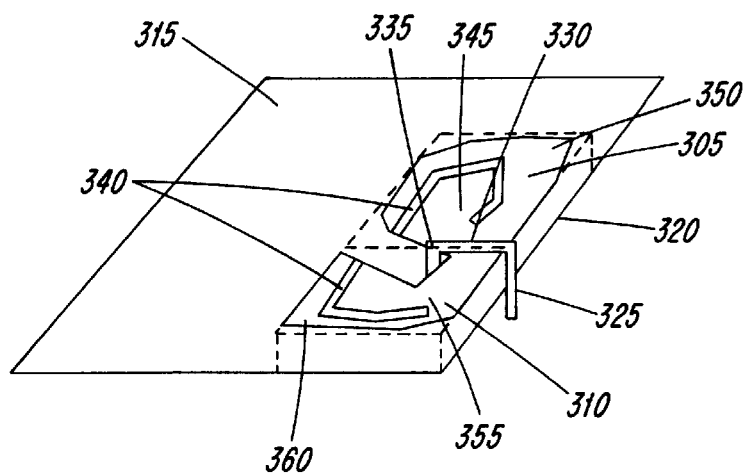
FIG. 3 illustrates a printed dual band two-patch antenna on a PCB.

FIG. 3 illustrates an exemplary built-in patch antenna assembly according to the present invention. The exemplary built-in patch antenna assembly comprises two patch parts 305 and 310, each having a different size. The two patch parts 305 and 310 are attached to the printed circuit board (PCB) 315 via a dielectric substrate 320 and are connected to opposite sides of a matching bridge 330. A slot 340 is formed in each patch part 305 and 310 which divides the patch parts into sub-parts 345, 350 and 355, 360, the importance of which is discussed in detail below. The patch parts 305 and 310 are positioned over the PCB 315 and form slots between the patch parts and the PCB 315. One skilled in the art will appreciate that the patch parts form the main radiators (or sensors) of the present antenna system.

As evident from FIG. 3, the patch parts 305 and 310 are fed by the feeding pin 325. The built-in antenna also includes a matching bridge 330 positioned between the feeding pin 325 and the grounded post 335. The matching bridge 330 acts to tune the antenna and forms a small loop antenna between the feeding pin 325 and grounded post 335. Tuning of an antenna refers to matching the impedance seen by an antenna at its input terminals such that the input impedance is seen to be purely resistive, i.e., it will have no appreciable reactive component. The tuning of the antenna system of the present invention is performed by measuring or estimating the input impedance associated with an antenna and providing an appropriate impedance matching circuit (i.e., the matching bridge). The matching of the antenna, according to the present invention, can be adjusted by changing the length of the matching bridge 330. This is accomplished by simply changing the location of the grounded post 335. The length of the matching bridge is generally in the order of $0.01\lambda$ to $0.1\lambda$.

It is evident from FIG. 3 that the two patch parts 305 and 310 of the antenna system are of different sizes. By controlling the size of the patch parts, the antenna is capable of being tuned to different frequency bands. The first patch part 305 of the multiple band antenna is of a size (generally a quarter wavelength of the frequency band to which the patch part is to be tuned) so as to be resonant at frequencies in a first lower band, and the second patch part 310 is of a size so as to be resonant at frequencies in a second higher band. The two patch parts can be made resonant at any frequency. For example, the first band may be the GSM band and the second band may be the DCS band. Some of the possible combinations of low and high bands may include GSM+PCS, GSM+WCDMA, DCS+WCDMA, GSM+GPS, GSM+ISM, or any other combination of lower and higher frequency bands.

As set forth above, each patch part 305 and 310 includes a slot 340 which acts to separate the patch part into sub-parts. Each sub-part of a patch part is resonant at a different frequency within the same frequency band to which the patch part is tuned. For example, if the first patch part 305 is of a size that enables it to be resonant at frequencies in the GSM band, then the sub-parts of patch part 305 could be made resonant at different frequencies within the GSM band. As a result, a broader bandwidth can be achieved.

Figure 4:
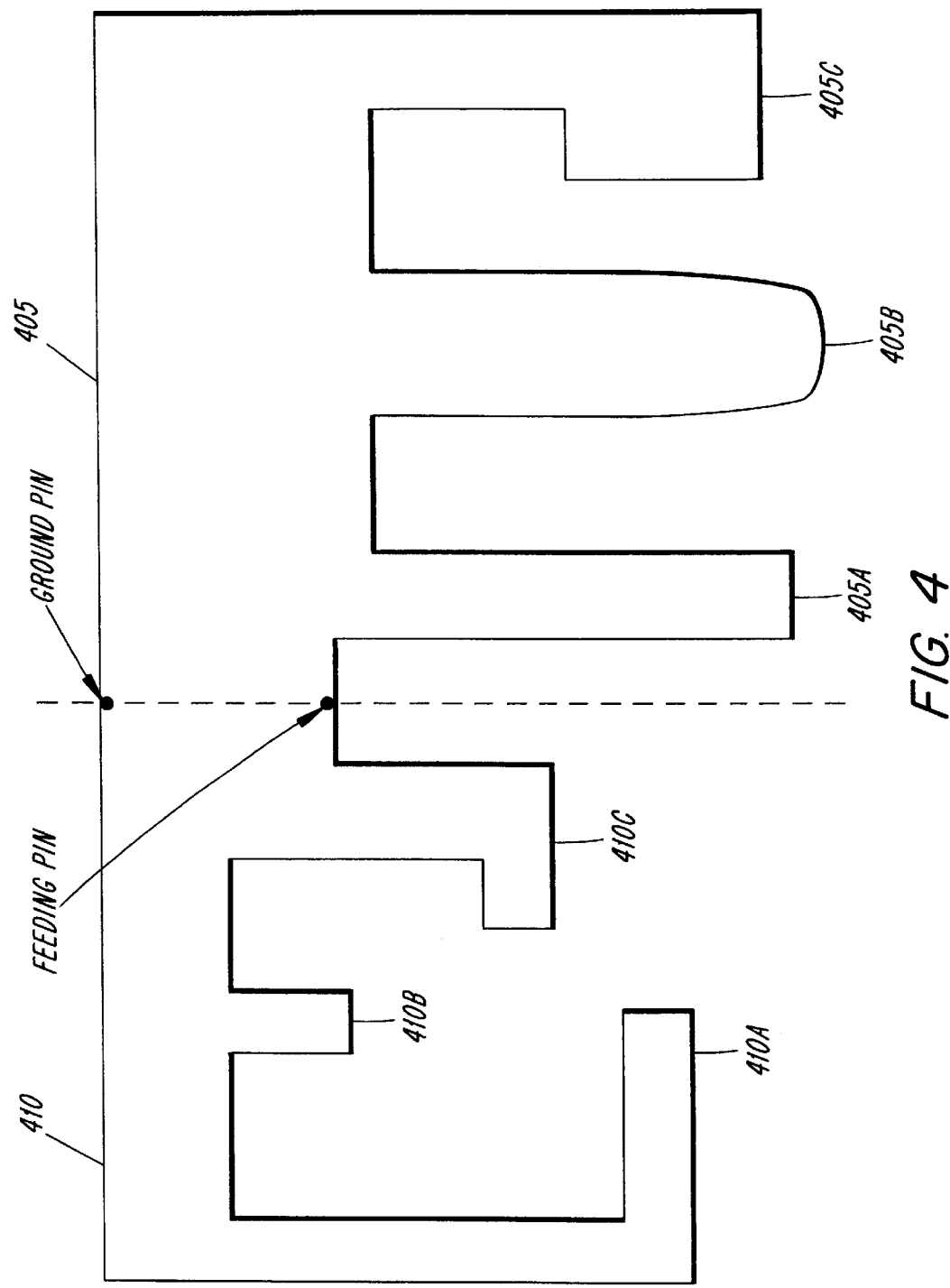
FIG. 4 illustrates an antenna configuration in which each patch part is formed of three sub-parts.

One skilled in the art will appreciate that, as an alternative, three or more subparts can be formed in each patch part. FIG. 4 illustrates an exemplary configuration in which each patch part is formed of three sub-parts. As illustrated, the first patch part 405 is cut into three sub-parts 405A–405C and the second patch part 410 is also cut into three sub-parts 410A–410C. Each of the sub-parts can be made resonant at a different frequency within the same frequency band to which their respective patch part is resonant. As such, broader bandwidth can be achieved by such a configuration, however, tuning is more difficult.

Returning to FIG. 3, the patch parts 305 and 310 can be of any shape, including three dimensional. The size of the patch parts, however, should be approximately a quarter of the wavelength of the frequency to which the patch parts are to be tuned.

The resonant frequencies and bandwidth of the built-in multiple band patch antenna are dependent upon the area and thickness of the dielectric substrate, the type of dielectric material selected (i.e., the dielectric constant), the patch size and the size and location of the slots. One skilled in the art will appreciate that an increase in the area or thickness of the dielectric substrate or patch size or a decrease in the value of the dielectric constant results in an increase in the bandwidth which can be achieved. Moreover, the bandwidth also depends on the size and location of the slots formed in the patch parts.

As is evident from FIG. 3, the built-in multiple band patch antenna can be mounted at the edge of the PCB which provides for better radiation efficiency and bandwidth. In addition, the PCB space requirement for the built-in multiple band patch antenna is minimized due to its small size.

Figure 1A:
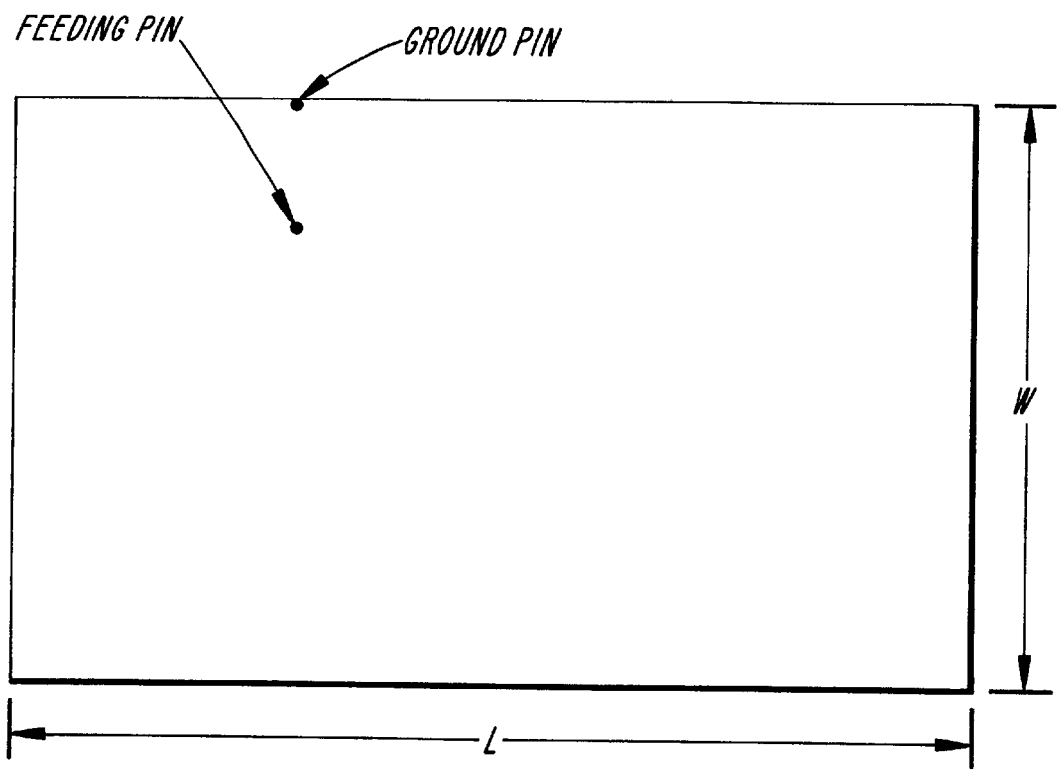
FIGS. 1A and 1B illustrate a conventional planar patch antenna compared to the conventional meandering inverted-F antenna.
Figure 1B:
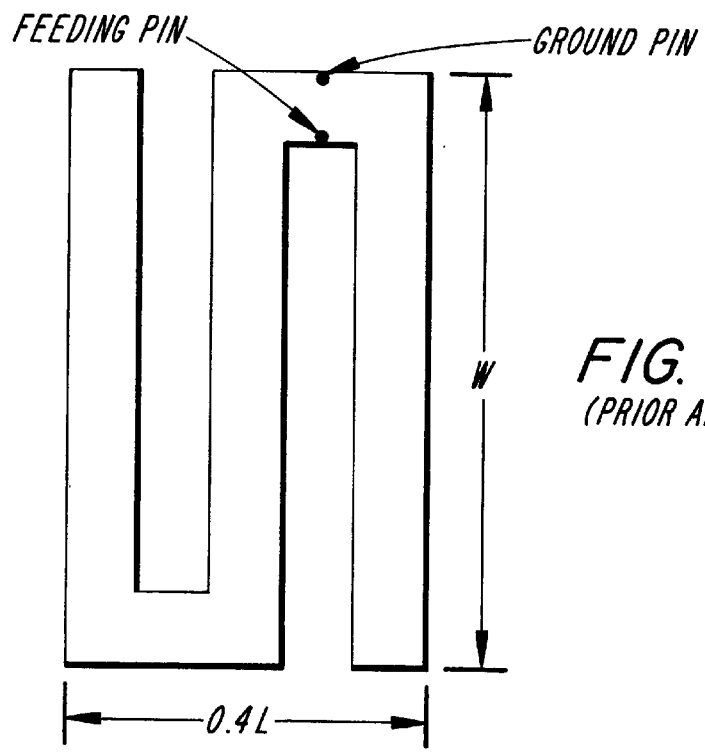
Figure 5A:
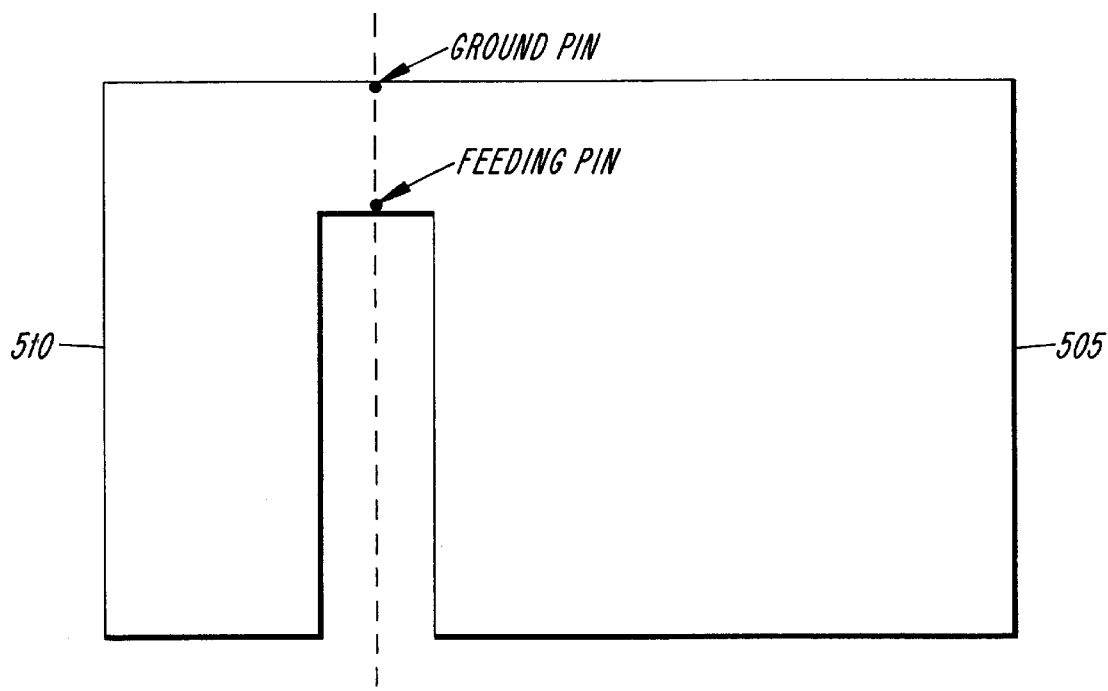
FIGS. 5A and 5B illustrate the process of forming a broad band, multiple band antenna.
Figure 5B:
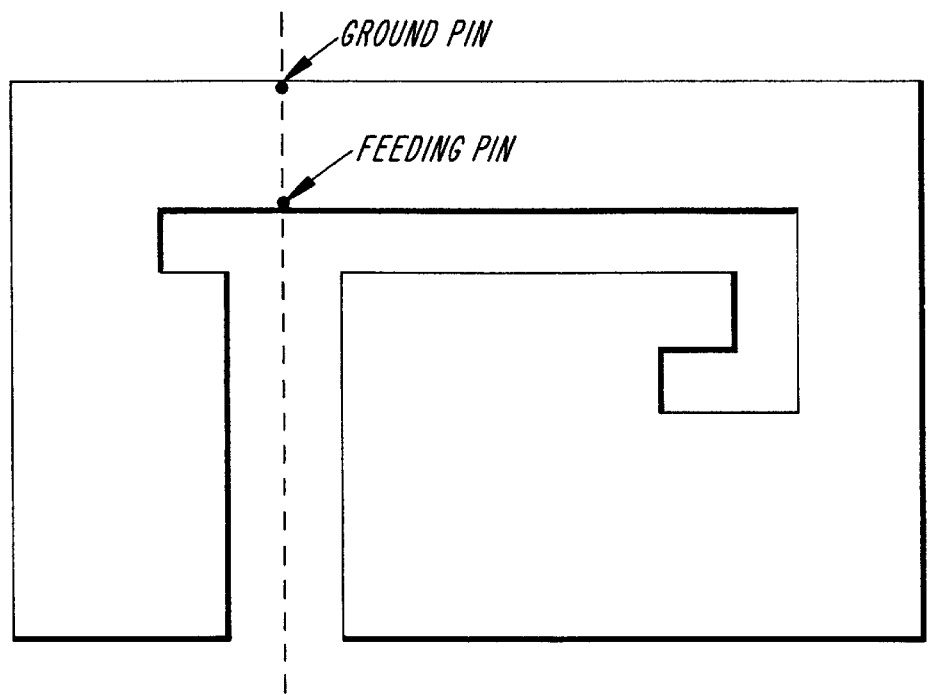

FIGS. 5A and 5B illustrate a technique by which the broad band, multiple band patch antenna is formed. The broad band, multiple band patch antenna can be formed from a conventional patch antenna by forming a slot in the conventional patch antenna, such as the one illustrated in FIG. 1A, along an axis of the matching bridge so that two patch parts are created, connected to opposite sides of the matching bridge (see FIG. 5A). Each part is of a size which enables it to be resonant within a different frequency band. The larger part 505 is resonant at a lower frequency and the smaller part 510 is resonant at a higher frequency. The actual forming of the slot can be performed by, for example, any one of the following methods: cutting, etching, MID (3D metalization) or chemical processing.

A slot is then formed in each patch part so as to divide each patch part into sub-parts (see FIG. 5B). The slots can be of an arbitrary shape; however, slot shape also affects the achievable bandwidth. As indicated above, each sub-part of a patch part is resonant at a different frequency or frequency range within the same frequency band to which the patch part is tuned thereby increasing the bandwidth of the antenna.

In order to make the antenna operable in three frequency ranges, the high band patch part 510 may be modified. Specifically, the high band patch part 510 can be moved out of the PCB 315 (of FIG. 3).

Figure 6A:
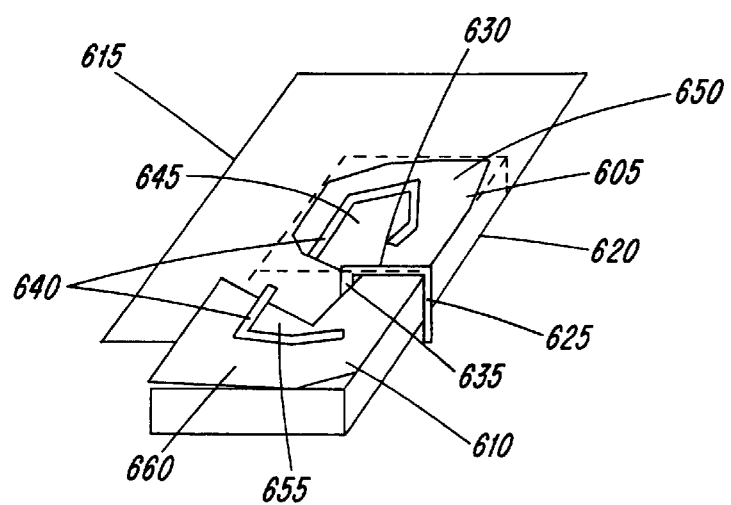
FIG. 6a illustrates a semi built-in multi-band printed antenna of the present invention.

As illustrated in FIG. 6a, the high band patch element 610 is placed outside the PCB 615 according to exemplary embodiments of the present invention. This results in an increase in the equivalent volume of the antenna at the higher frequency band. A small antenna has a small volume which results in a small bandwidth. This is illustrated in FIGS. 6b and 6c. With reference to FIG. 6b, if an antenna 610 is placed on the PCB 615, the volume 675 of the antenna is on the top side of the PCB 615. By placing the antenna 610 outside the PCB 615 as illustrated in FIG. 6c, the equivalent antenna volume 675 is at both the top and bottom sides of the PCB 615 which results in a greater bandwidth. The EM waves 660 corresponding to the high band antenna 610 are more easily matched to the space when the antenna is outside the PCB and result in a broader bandwidth. The EM waves 660 of the high band antenna element 610 in FIG. 6b radiate in the manner illustrated. The PCB, which may be made of a conducting element, prevents the waves from traveling through the PCB. In an embodiment of the present as illustrated in FIG. 6c, the EM waves radiate on both sides of the PCB due to the location of the high band antenna 610. The radiating elements of the high band patch may be supported by a substrate as the high band patch is moved away from the PCB. It may also be etched outside of the communication device. The substrate may be plastic for example.

Since the high band patch part 510 is now outside of the PCB, it may be printed in three dimensions which flexibility makes it useful for certain commercial applications. For aesthetic reasons, the handset may not be designed in the traditional rectangular or box-like shape. It may, for example, be designed with a curvature shape. Therefore, the built-in antenna will be in three dimensions. The high band element 610 can now be used to tune to both the DCS and the PCS bands while the low band element 605 is still tuned to the GSM band.

The two patches, i.e., high band element 610 and low band element 605, are connected to the matching bridge 630 from opposite directions. One end of the matching bridge 630 is an antenna feed pin 625 while the other end is the matching grounded post 635. As described earlier, the bigger patch is the low band element 605 which is resonant at the lower frequency band and the smaller patch is the high band element 610 that is resonant at the higher frequencies.

Since the patch size determines the dual band resonant frequencies, the antenna of the present invention can be designed for GSM, DCS and PCS frequencies. The patches may be of any shape. Each patch may be flat and very thin giving the appearance of not being three dimensional. The high band element may also be similar in appearance to conventional antennas which are enclosed in plastic or other similar structures.

An edge of each of the patch elements 605 and 625 is connected to the matching bridge 630. The remaining edges of the patch elements are not connected to the matching bridge 630. As described above with reference to FIG. 3, the slots 340 on the patches 305 and 310 divide the patches into sub-parts. Similarly, according to exemplary embodiments of Applicant's invention, as illustrated in FIG. 6, slots 640 divide the patches 605 and 610 into sub-parts. Each of these sub-parts is resonant at a particular frequency within each frequency band for which the patch is designed. Two such sub-parts 645 and 650 corresponding to the low band element 605 and two sub-parts 655 and 660 corresponding to the high band element 610 are illustrated in FIG. 6. These sub-parts results in wider band patch antenna as described above. The subparts may be of varius shapes.

With respect to the characteristics of each of the patch elements, they have been described above with respect to FIG. 3. For instance, the bandwidth depends on the size of the patch, the shape of the patch, shape of the slots, the location of the slots, the thickness of the substrate and the substrate material. A larger patch area results in a broader bandwidth for the antenna. A larger gap between the patch and an edge of the PCB also results in a broader bandwidth for the antenna. The length of the matching bridge may be changed to adjust the matching of the antenna.

Figure 7:
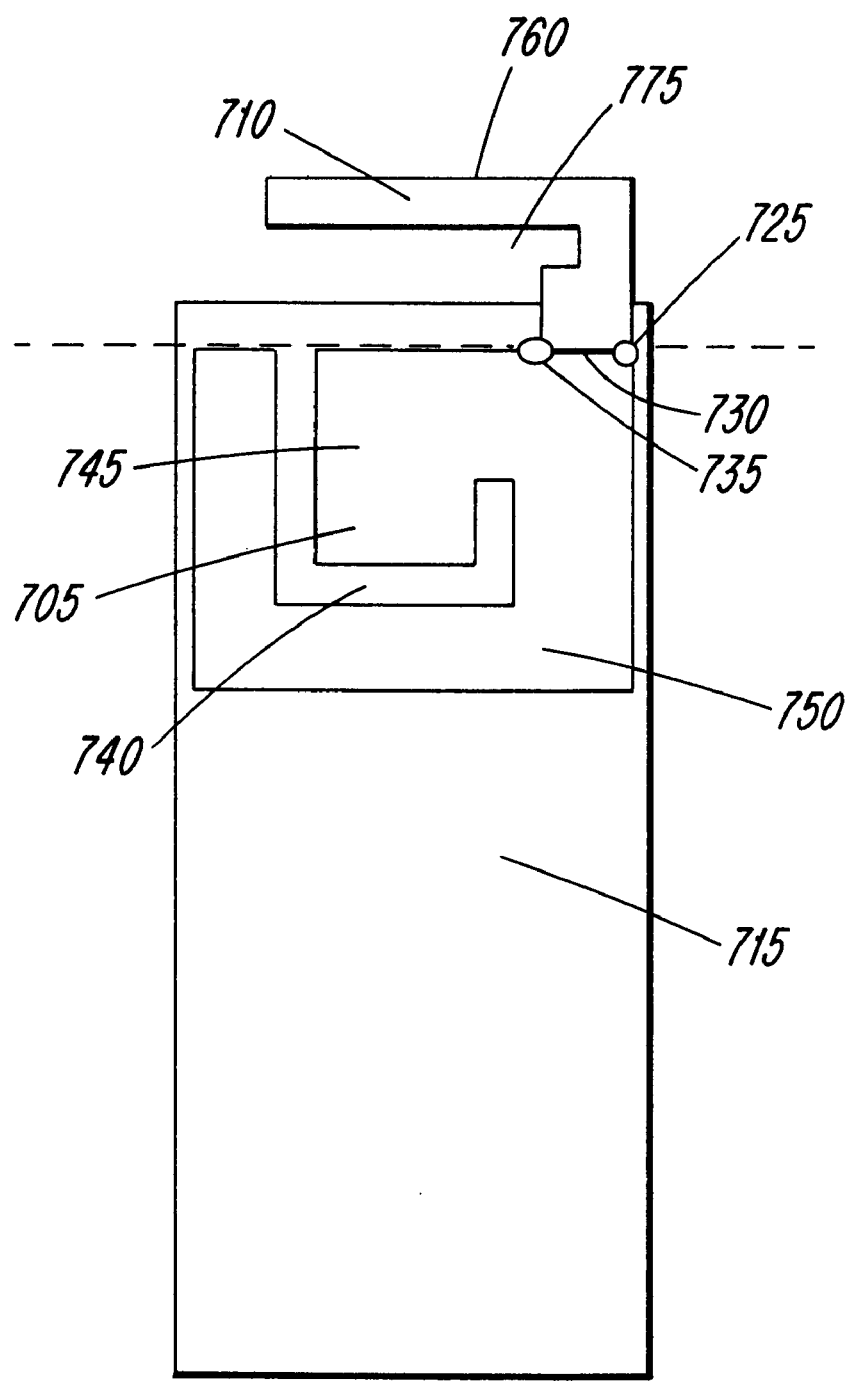
FIG. 7 illustrates a top view of a rectangular semi built-in multi-band printed antenna according to the present invention.
Figure 8:
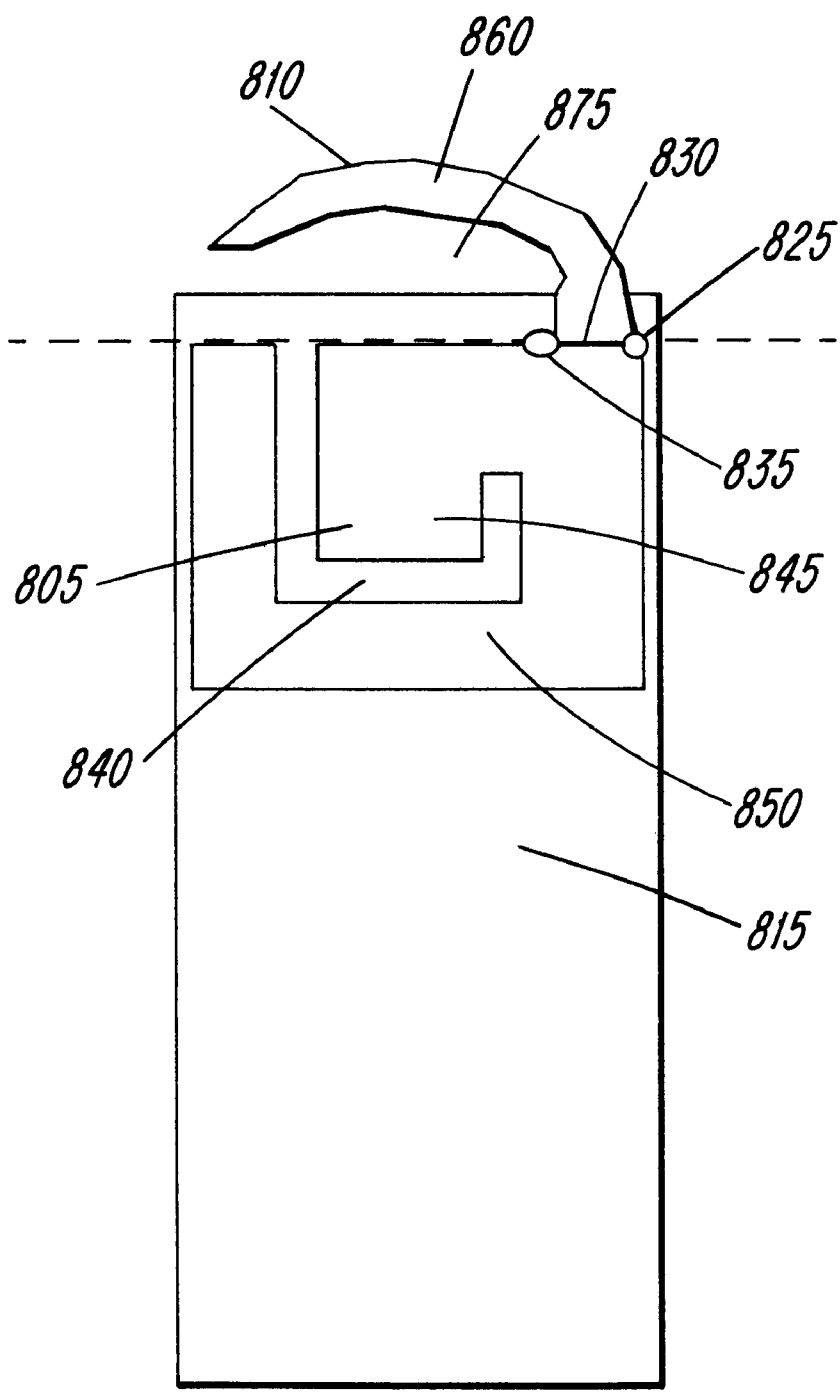
FIG. 8 illustrates a top view of a semi built-in multi-band printed antenna of the present invention with an arcuate high-band element.
Figure 9:
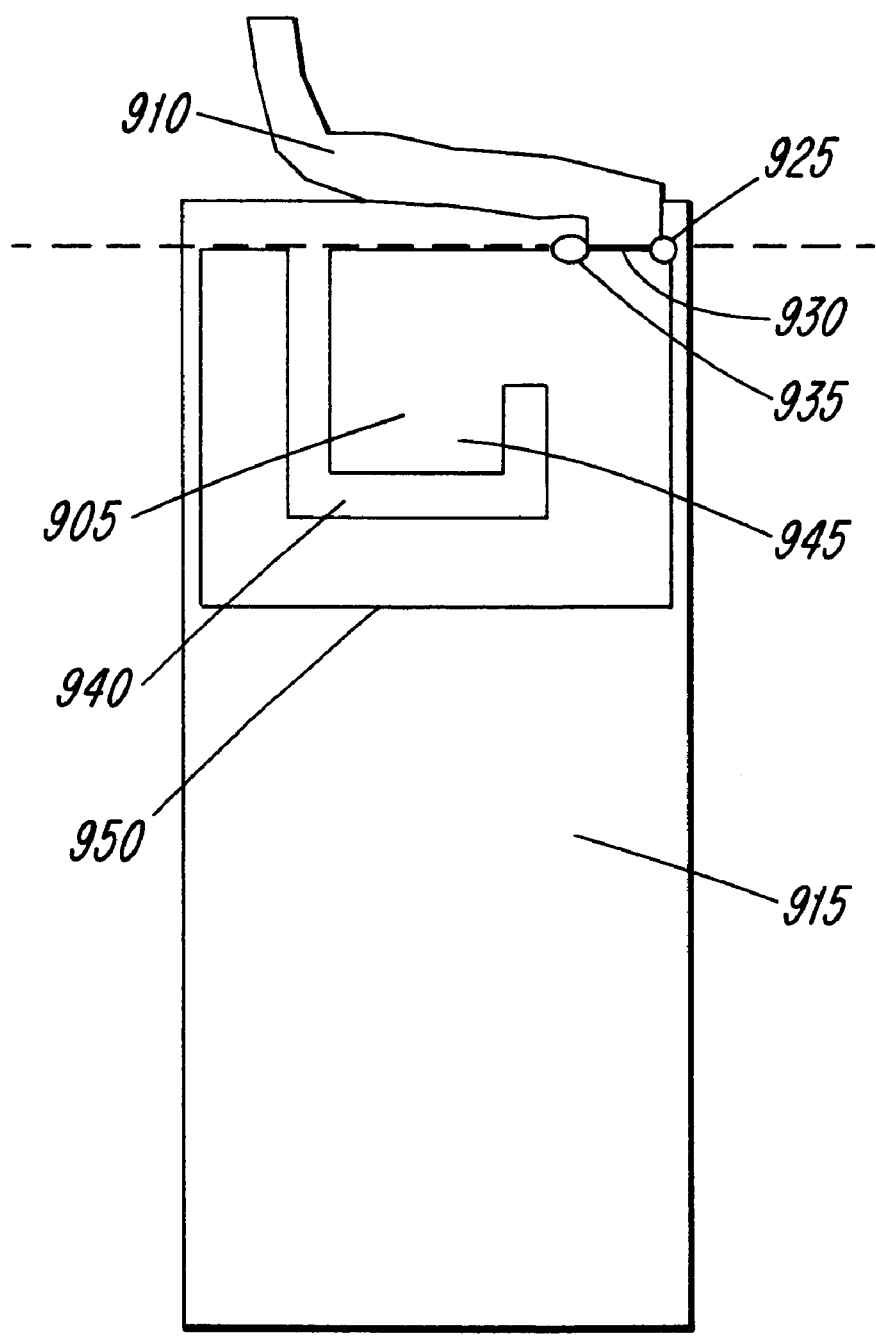
FIG. 9 illustrates a top view of a semi built-in multi-band printed antenna of the present invention with the high-band element having a projecting end.
Figure 10:
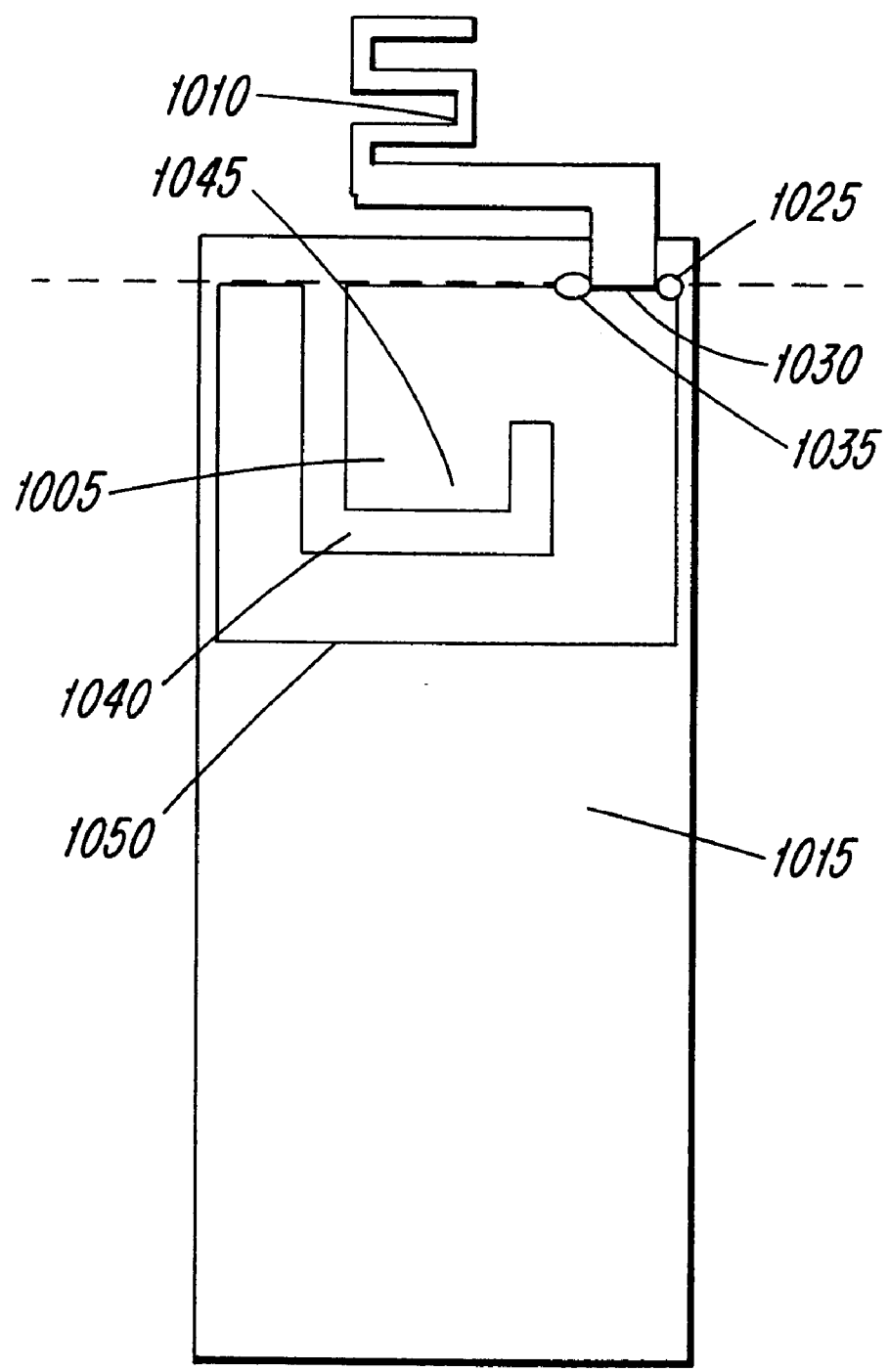
FIG. 10 illustrates a top view of a semi built-in multi-band printed antenna of the present invention with an end of the high-band element being a meander line forming a stub.

An antenna according to one embodiment of the present invention is illustrated in FIG. 7 in which the high band element 710 is rectangular and is located over the top edge of the PCB 715. The space between the element 710 and the PCB 715 permits the antenna to be tuned to the PCD and DCS frequency ranges. FIG. 8 illustrates another exemplary antenna design in which the high band element 810 is also over the top edge of the PCB 815 but is formed as an arc. Similarly, in FIG. 9, the high band element 910 is over the top edge of the PCB 915 and is formed with one end projecting upward. In FIG. 10, the high band element 1010 is over the top edge of the PCB 1015 and is a meandering element which can be altered to form a stub.

Figure 11:
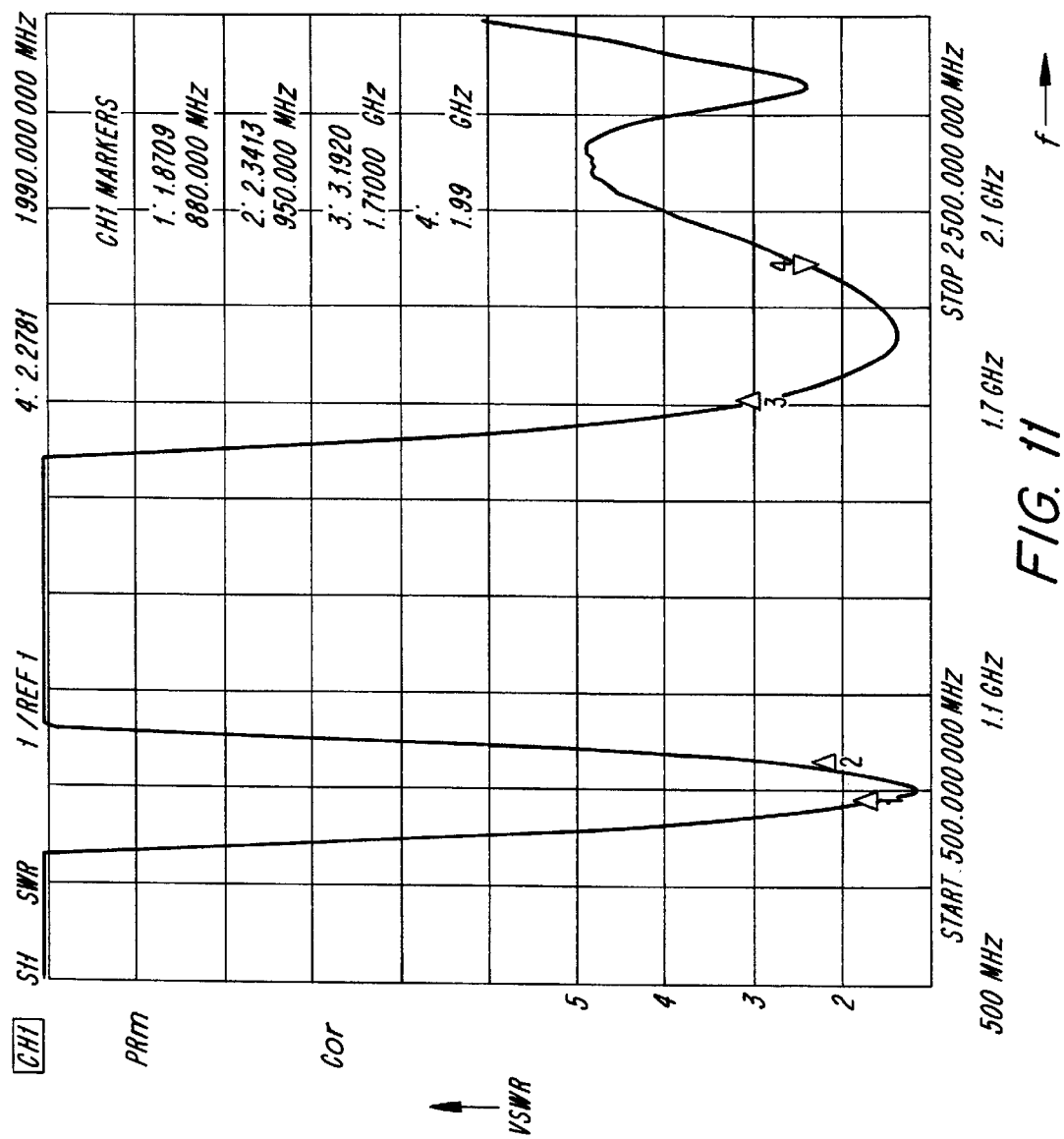

In order to illustrate the effectiveness of the present invention, FIG. 11 sets forth results of a simulation for the exemplary dual band patch antenna illustrated in FIG. 7. Purely for purposes of illustrating the present invention, the following values for the various parameters enumerated above for a semi built-in multi-band printed antenna may be used. The antenna, i.e., both the high and low patch elements 705 and 710 of FIG. 7, has dimensions of 30 mm×40 mm. The antenna has a height of 5 mm. The space 740 by which the high patch element 710 is separated from the PCB 715 may be 5 mm. The substrate may be plastic and may be 1 mm in thickness. The parts of the high and low element patches are made resonant at the GSM, DCS and PCS frequency ranges.

FIG. 11 illustrates the VSWR performance of this design. The bandwidth is 8.7% (i.e., about 80 MHz) at the GSM band for a VSWR of less than 2.35:1. In the DCS frequency band, the bandwidth is 15.6% (i.e., about 280 MHz) for a VSWR less than 3.2:1. Finally, at the PCS band, the bandwidth is 14.6 (i.e., about 280 MHz) for a VSWR of less than 3.2:1. As is evident from FIG. 11, this antenna meets the requirements of a GSM/DCS/PCS triple frequency application.

The foregoing has described the principles, preferred embodiments and modes of operation of the present invention. However, the invention should not be construed as being limited to the particular embodiments discussed above. For example, while the antenna of the present invention has been discussed primarily as being a radiator, one skilled in the art will appreciate that the dual band patch antenna of the present invention would also be used as a sensor for receiving information at specific frequencies. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A communication device for use in a radio communication system, said device comprising:
   a microphone opening for allowing the communication device to receive auditory information from a user;
   a speaker opening for allowing the communication device to transmit auditory information to said user;
   a keypad; and
   a semi built-in multiple band printed antenna, said antenna comprising:
      a first patch part located on a printed circuit board (PCB) within said communication device and tuned to a first frequency band,
      a second patch part located outside said PCB and tuned to a second frequency band different from said first frequency band, and
      at least one slot formed in each of said first and second patch parts.

2. The communication device of claim 1 wherein said first frequency band is a lower frequency band and said second frequency band is a higher frequency band.

3. The communication device of claim 2 wherein said second frequency band further comprises two frequency ranges.

4. The communication device of claim 3 wherein said first frequency band is one of the 800 MHZ frequency band and the 900 MHZ frequency band.

5. The communication device of claim 4 wherein one of said frequency ranges within said second frequency band is the 1900 MHZ frequency range.

6. The communication device of claim 5 wherein another of said frequency ranges is the 1800 MHZ range.

7. The communication device of claim 1 wherein each of said patch parts are of an arbitrary three-dimensional shape.

8. The communication device of claim 1 wherein each of said patch parts are of an arbitrary two-dimensional shape.

9. The communication device of claim 1 further comprising a matching bridge for matching an input impedance of said antenna.

10. The communication device of claim 9 wherein the matching of said antenna is adjusted by changing a length of the matching bridge.

11. The communication device of claim 1 wherein said at least one slot divides each patch part into sub-parts.

12. The communication device of claim 11 wherein each sub-part of a respective patch part is resonant at a different frequency within the frequency band to which the respective patch part is tuned.

13. The communication device of claim 1 wherein said at least one slot in each of said patch parts is of a shape so as to form said patch parts into a twin spiral configuration.

14. The communication device of claim 1 wherein the frequency band to which each patch part is tuned is dependent on a size of the patch part.

15. The communication device of claim 1 further comprising a substrate onto which said semi built-in multiple band printed antenna is mounted, said substrate being mounted on said PCB.

16. The communication device of claim 1 wherein sizes of the patch parts are selected to be approximately ¼ wavelength of the first and second frequency bands.

17. A communication device for use in a radio communication system, said device comprising:
   a printed circuit board (PCB) mounted on a chassis of said communication device;
   a substrate attached to said PCB and having a predetermined thickness; and
   a patch antenna mounted on said substrate and comprising a plurality of patch parts, each having at least one slot formed therein, a first of said patch parts being located on the PCB and tuned to a first frequency band and a second of said patch parts being located outside said PCB and tuned to a second frequency band, said frequency band being different from the first frequency band.

18. The communication device of claim 17 wherein a first of said plurality of patch parts is tuned to a lower band and a second of said plurality of patch parts is tuned to a higher band.

19. The communication device of claim 18 wherein said higher band comprises two frequency ranges.

20. The communication device of claim 19 wherein one of said frequency ranges is the 1900 MHZ frequency range.

21. The communication device of claim 19 wherein another one of said frequency ranges is the 1800 MHZ frequency range.

22. The communication device of claim 18 wherein another of said at least one slot separates each patch part into a plurality of sub-parts, the sub-parts for each patch part being resonant at different frequencies within a same frequency band.

23. The communication device of claim 17 further comprising a matching bridge for matching an input impedance of said antenna and located between a feeding point and a ground post.

24. The communication device of claim 23 wherein the matching of said antenna is adjusted by changing a length of the matching bridge.

25. The communication device of claim 17 wherein sizes of said plurality of patch parts are selected to be approximately ¼ wavelength of the first and second frequency bands.

26. The communication device of claim 17 wherein a bandwidth of said antenna depends on a size of said patch parts, a shape and location of said at least one slot, and the thickness and dielectric constant of said substrate.

27. The communication device of claim 17 wherein each of said patch parts is of an arbitrary two-dimensional or three-dimensional shape.

28. The communication device of claim 17 wherein a shape of said at least one slot is arbitrary.

* * * * *